Oct. 18, 1955  R. W. ROSS  2,721,109
X-Y RECORDER

Filed June 14, 1954  4 Sheets-Sheet 1

Oct. 18, 1955 R. W. ROSS 2,721,109
X-Y RECORDER
Filed June 14, 1954 4 Sheets—Sheet 3

Oct. 18, 1955

R. W. ROSS 2,721,109

X-Y RECORDER

Filed June 14, 1954

United States Patent Office 2,721,109
Patented Oct. 18, 1955

2,721,109

X-Y RECORDER

Raymond W. Ross, Cheltenham, Pa., assignor to Leeds and Northrup Company, Philadelphia, Pa., a corporation of Pennsylvania Application June 14, 1954, Serial No. 436,325

10 Claims. (Cl. 346—29)

This invention relates to exhibiting instruments and apparatus for indicating and/or recording the magnitudes of concurrent conditions and has for an object an improved exhibiting instrument for simultaneously indicating and/or recording the magnitudes of an independent variable and at least one dependent variable.

Though not limited thereto, the present invention finds particular applicability where it is desired to indicate and record the changes in magnitude of one condition with respect to changes in magnitude of a second condition. Therefore, an instrument embodying the present invention may be used to indicate and record temperature-pressure characteristics of an internal combustion engine, the hysteresis characteristics of a transformer core, the characteristics of a frequency-responsive network, and other characteristics which will readily come to mind of those skilled in the art. In all of the foregoing examples it is necessary to produce a relative movement in two directions between coordinates or scales disposed at right angles and an indicator, or relative movement in two directions between a chart and a marking instrument.

In accordance with the present invention there is provided mechanism for producing the aforementioned desired relative movement which is simple and inexpensive as compared to prior art devices and yet makes possible an exhibiting instrument which is both dependable and accurate.

In carrying out the present invention in one form there is provided an exhibiting apparatus which displays the magnitude of an independent variable along one coordinate and displays the magnitude of a dependent variable along another coordinate disposed at right angles thereto. The apparatus includes a pair of scales respectively supported by suitable means along the coordinates. An index means indicates by its position with respect to one of the scales the magnitude of the independent variable and also indicates by its position with respect to the other scale the magnitude of the dependent variable. A pair of arms are mounted on a pivoted means establishing a pivotal axis for rotation of the arms relative to one of the scales. The arms are spaced from one another a distance greater than the length of the other of the scales and are interconnected at their ends, remote from the pivotal axis by a member which through suitable means supports the index.

The index may be moved along the member by an arrangement including a driving cord and associated pulleys respectively carried by the member and the arms. The driving cord is attached to the index and has a portion coinciding with the pivotal axis. The index is moved relative to the member by a cord-driving member which is disposed adjacent the pivotal axis and rotated by means responsive to one of the variables.

The arms and the member, together with the index are rotated about the pivotal axis through an arcuate driving means cooperatively disposed with at least one of the arms. The arcuate driving member is rotated by a means responsive to the other of the variables. Through the driving members, the index is moved to positions relative to the coordinates and scales to indicate the magnitudes of both of the variables.

The supporting means may comprise a support for a chart calibrated along coordinates at right angles one to the other to form the pair of scales. In addition the index may include a marking device for producing on the chart a graphical record representative of the magnitudes of the variables.

For a more detailed understanding of the invention and for further objects and advantages thereof, reference is to be had to the following description taken in conjunction with the accompanying drawings, in which.

Figure 1:
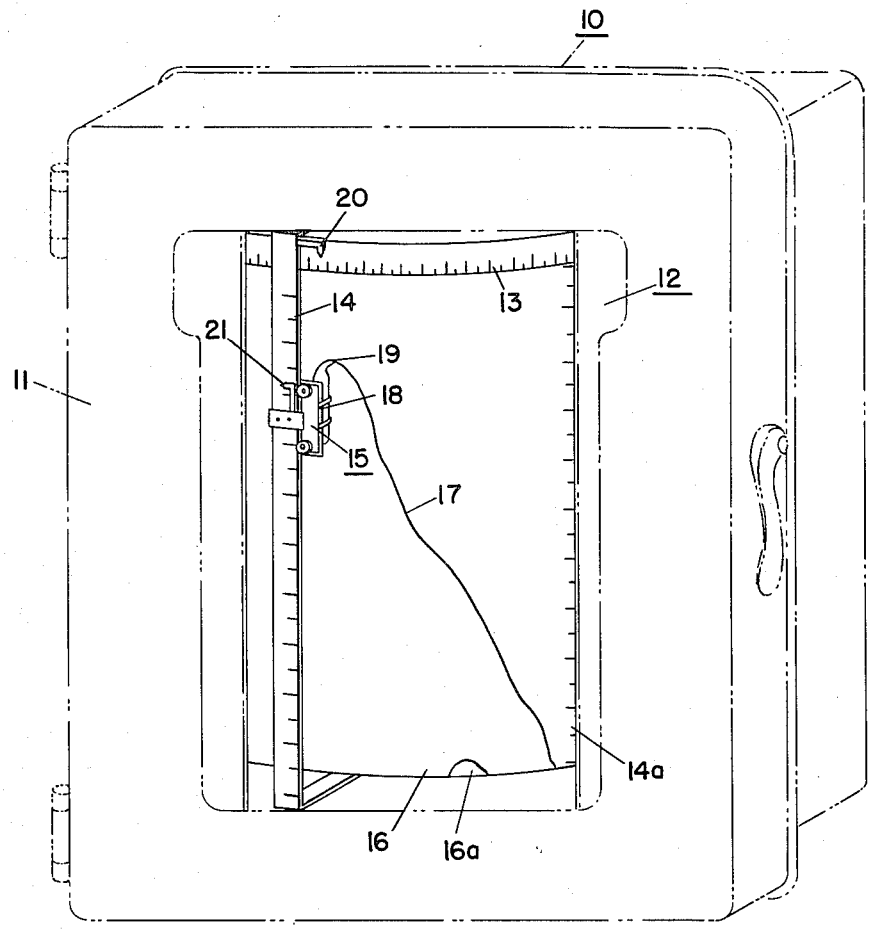
Fig. 1 illustrates an exhibiting instrument including a preferred embodiment of the present invention.

Referring now to Fig. 1, there is shown an instrument casing 10, illustrated in phantom, having a hinged door 11 in closed position so that the exhibiting apparatus appears as it would during use. The exhibiting apparatus or instrument 12 of the X–Y type includes a pair of scales 13 and 14 which are disposed along coordinates at right angles one to another by way of suitable supporting means. An index device 15 indicates by its position relative to one of the scales 13, 14 the magnitude of an independent variable and by its position relative to the other of the scales or coordinates the magnitude of a dependent variable.

In the embodiment illustrated, the scale 13 is arcuate in shape and horizontally disposed and supported near the top of the instrument 12 by suitable means. The scale 14 is supported with the index device 15 in a manner to be described hereinafter for movement relative to the first scale 13 and in response to changes in magnitude of one of the measured variables. The scale 14 can therefore indicate by its position relative to the scale 13, the magnitude of the measured variable. The index device 15 is adapted for movement along the common support and relative to the scale 14 in response to changes in magnitude of the other measured variable.

Alternatively, the scale 14 may be fixed along a side of the instrument 12, as shown at 14a in which case the indication of the magnitudes of the measured variables is preformed solely by the index device 15.

Associated with the scales 13 and 14 is a chart 16 which is at least coextensive with the scales and which is mounted on a chart support 16a provided with an arcuate or cylindrical surface conforming with the configuration of the arcuate scale 13. The chart support may be calibrated along adjacent sides to provide fixed scales 13, 14a. A permanent record of the variation in magnitudes of the conditions under measurement is had by producing a line 17, representative of the changes in the measured variables, as by a marking means 18 which may form an integral part of the index device 15 and which includes a pen 19. The pen 19 may be positioned as shown, offset from the scales 13, 14 and in which case, there may be provided, for instantaneous reading of the magnitude of one of the measured variables along the scale 13, an indicating element or pointer 20 which is positioned adjacent the graduated scale 13 and is mounted on and movable with the scale 14. In like manner there is provided, for instantaneous reading of the condition magnitude along the scale 14, an indicating element or pointer 21 which is affixed to the index device 15 and bodily movable therewith. In both instances the indicating elements 20, 21 are located on their respective supporting elements in positions directly opposite from the point of the inking pen 19.

Although the scale 14 and index 15 have been illustrated as movable about a vertical axis, it will become apparent from the discussion and description which follows hereinafter of the other embodiment that the arrangement shown is optional and that in the practice of the present invention the exhibiting apparatus may be effectively rotated 90 degrees so that the scale 14 and index 15 will move about a horizontal axis.

Figure 2:
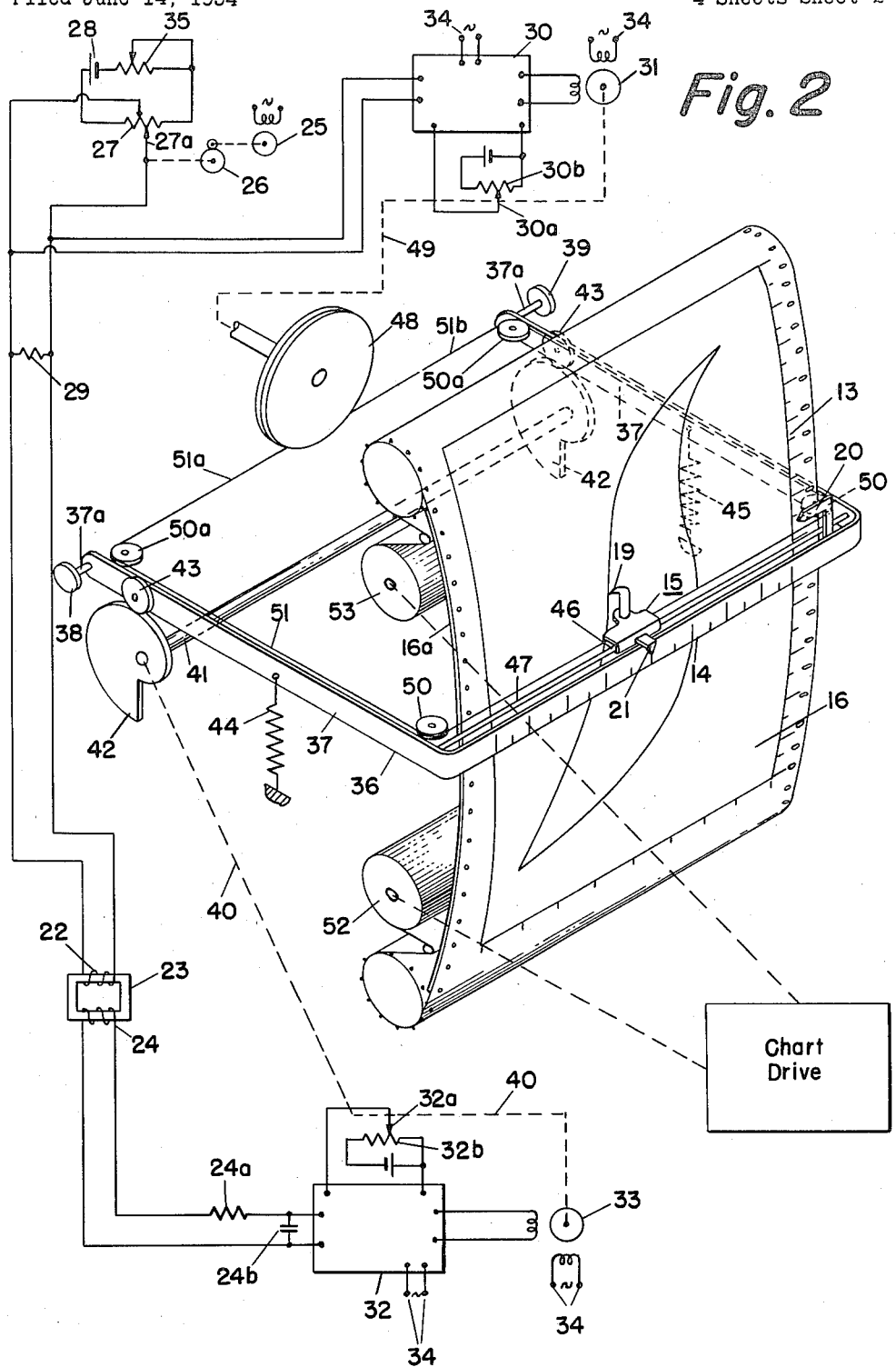
Fig. 2 illustrates in perspective another embodiment of the present invention together with a typical application of the invention.

In Fig. 2 there is illustrated an embodiment of the invention in which the scale 14 and index 15 are moved about a horizontal axis. The index device 15 and the pen 19 are made movable bodily relative to the scale 14 in accordance with a magnetizing force, an independent variable, applied by a coil 22 to a magnetic structure 23, while the scale 14, carrying with it the index device 15 and the pen 19 is moved in a vertical direction relative to the scale 13 in accordance with the magnitude of flux, a dependent variable, in the magnetic structure or core 23 and threading the coil 24. The extent of magnetizing force applied to the coil 22 is determined by the rotation of a motor 25 which drives through gearing 26 a contact 27a relative to a slidewire 27 to apply from a battery 28 to the coil 22 a current of variable magnitude and reversible polarity. The magnitude of the current from battery 28 develops across a shunt 29 a voltage which is measured by a suitable measuring system 30 which may be of the type fully disclosed in Letters Patent No. 2,113,164 to Williams. Such a measuring system includes means for controlling a motor 31 which is operated in sense and to an extent corresponding with the change in voltage across the shunt 29.

The voltage developed across the coil 24, which is proportional to the rate of change of flux, is integrated by the network comprised of resistor 24a and capacitor 24b and the resultant voltage, representative of flux, is measured by a system 32, similar to the system 30, and serves to control the sense and extent of rotation of a motor 33. Both motors 31 and 33 are shown to be of the two-phase type, including control and power windings; the control windings receiving energization from the outputs of the respective measuring systems 30, 32, and the power windings being energized by way of suitable sources of alternating-current supply represented by terminals 34. A series of B—H curves, or hysteresis curves, may be obtained for different degrees of magnetization, the degree of magnetization being readily controlled as by adjustment of a rheostat or resistor 35.

In the embodiment of Fig. 2 the scale 14 is formed as part of framework structure 36 which is illustrated as substantially U-shaped, but which may be constructed of rectangular configuration. The scale graduations may be engraved on the metallic base portion of the structure but preferably the scale is a separate element removably mounted on the structure. The structure 36 includes a pair of arms 37 having their free ends pivotally mounted by way of stub shafts 37a in thrust bearings 38, 39 secured to framework of the exhibiting device (not shown). The framework structure 36 is caused to rotate about a horizontal axis, defined by stub shafts 37a, to position index 15 and scale 14 relative to chart 16 and scale 13 in response to the motor 33 through a driving arrangement including cams 42 and cam followers 43. The cams 42 and followers 43 may be positioned either intermediate the arms 37a and therefore within the framework structure or as shown without the area bounded by the framework structure. The cam followers 43 are rotatably mounted on respective arms 37 at a position offset from the horizontal axis and translate the rotation of cams 42 on their shafts 41 to rotation of the framework structure 36 about the horizontal axis. Displacement of the armature of motor 33 in response to changes of input signal to the measuring system 32 is transmitted mechanically to the shaft 41 and cams 42 by way of a connecting shaft 40, illustrated by dotted lines. The shaft 40 is also common to the slidewire contact 32a so that simultaneously with cam movement there is an adjustment of the slidewire 32b in a system balancing direction.

The cam followers 43 may be biased against the surface of the cam 42 by the weight of the framework structure 36 pivoted about the stub shafts 37a. However, the framework 36 comprising the arms 37 and scale 14 is preferably made very light of weight and with sudden change of position may tend to bounce and in some cases fail to accurately follow the cam movement throughout the recording cycle. Therefore, in order to avoid erratic movement of the framework 36 and the indicating device 15 carried thereby, there may be provided a pair of springs 44, 45 connecting the arms 37 respectively to the framework of the exhibiting apparatus to provide for proper biasing of the cam followers 43 against the surface of their respective cams 42.

The index device 15, together with the pen 19 and the indicating member 21, made integral therewith, is mounted on a sleeve 46 in slidable engagement with a rod 47 extending from one end of the scale 14 to the other and having its opposite ends connected to arms 37. Motion of the index device 15, relative to scale 14 and to chart 16 in response to variations in the degree of magnetization of the core 23, is effected through a cord or string arrangement now to be described.

The driving arrangement for the index device 15 includes a main pulley 48, mechanically connected to the rotor of the motor 31 as by shaft 49, a plurality of coplanar pulleys 50, 50a rotatably mounted to the arms 37 within the confines of the area defined by the U-shaped framework 36. A driving cord 51, preferably made of nylon braided about a glass core to give it a non-elastic property, is connected by its ends to opposite sides of the sleeve 46 or to a common point on the sleeve and passes over all of the pulleys 48, 50 and 50a. Rotation of the motor 31 will cause through shaft 49 a rotation of pulley 48 and, through the driving arrangement above described, will effect respectively adjustment of the indicating device 15 and the pen 19 relative to the scale 14 and to the chart to indicate and record the change in magnetization of the core 23.

In order to prevent the movement of the index 15 along the scale 14 due solely to movement of the framework 36 and arms 37 about the horizontal axis the portions 51a and 51b of the cord or string 51 are located in the horizontal axis of rotation of the framework. In carrying out this construction the pulleys 50a are located so that the horizontal axis of rotation of the framework 36 is tangential to the peripheries of the pulleys. By placing portions 51a and 51b of the string 51 in the horizontal axis of rotation of framework 36, there is also prevented rotation of the framework due solely to movement of the index device 15 along the scale 14 when it is moved by the string drive arrangement.

The material of the chart 16 may be provided from a supply roll 52 in a continuous strip. After a record of the measured variables or characteristics has been made, the recorded portion of the chart may be removed from the recorder or, if preferred, the recorded portion of the chart 16 may be wound about a take-up roll 53 while withdrawing from the supply roll 52 a length of chart coextensive in length with said chart support.

If desirable the chart 16 may be driven in a manner disclosed in Moore Patent No. 2,690,951, so to provide the indicating device with a means for taking into account a third variable, such as, for example, time.

For reasons of clarity and for a better understanding of the invention, the measuring system potentiometers 30b, 32b and rebalancing motors 31, 33 have been shown schematically apart from the indicating and recording apparatus of the visual indicating device. Preferably and in accordance with the present invention, the motors 31 and 33 are mounted within the area between the pivotal axis of the arms 37 and the chart 16. The potentiometers are likewise mounted within the area above defined and on stub shafts which are gear-connected to the shafts of the motors 31 and 33. The above-referred to arrangement will be better understood from a full description of the preferred embodiment of the present invention which follows hereinafter.

Figure 3:
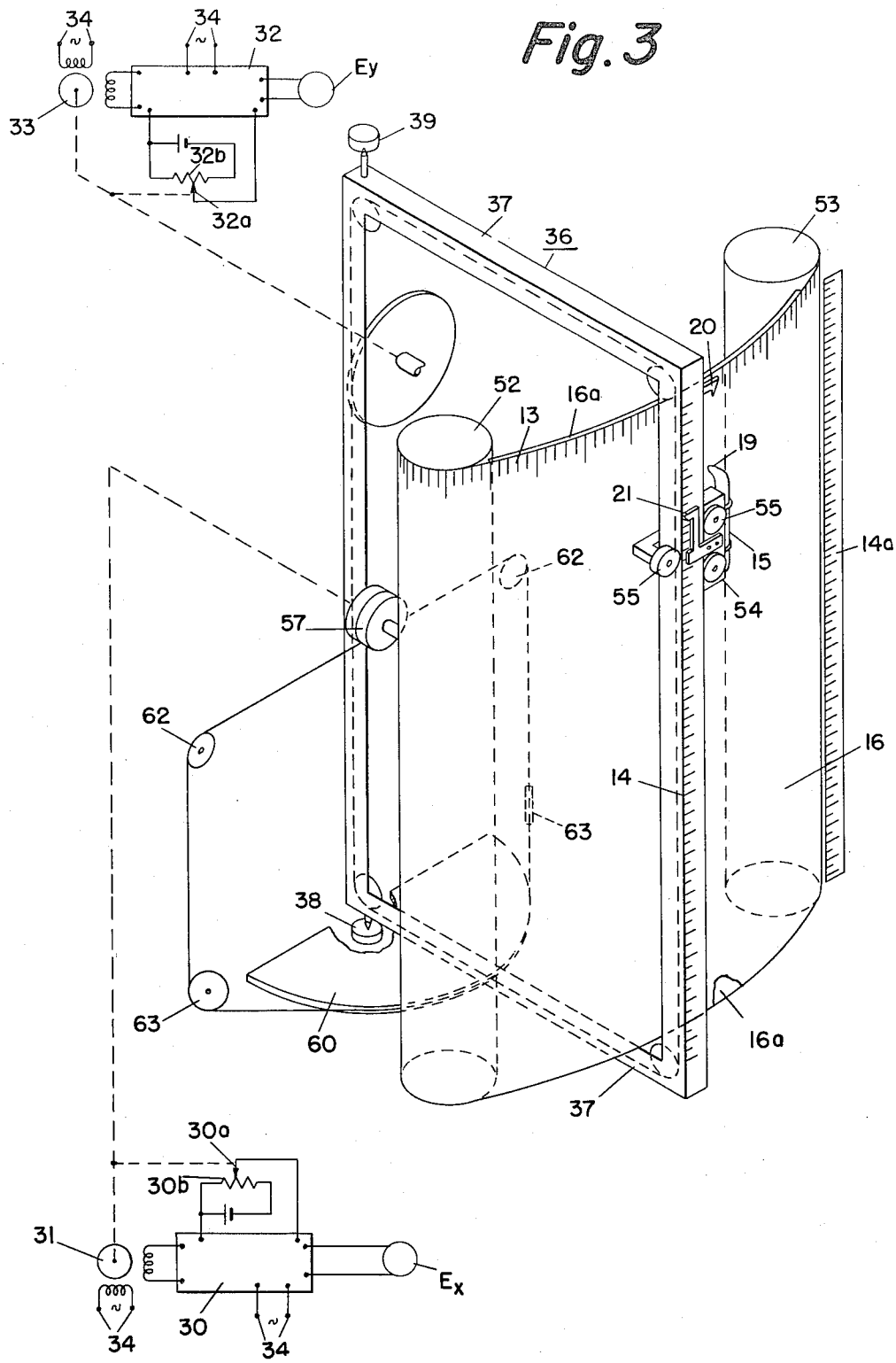
Fig. 3 illustrates in perspective a front view of the preferred embodiment of the present invention.

In Fig. 3 there is illustrated the preferred embodiment of an exhibiting device whose operation closely follows that of the exhibiting apparatus of Fig. 2 in that the index device 15 is caused to be moved in two directions, X and Y, relative to the coordinates or scales 13 and 14. The movement is in response to changes in magnitude of measured variables which here have been generically illustrated as sources of signal voltage $E_x$ and $E_y$. The sources $E_x$, $E_y$ may represent changes in such functions as temperature-pressure, frequency-impedance, or the B—H characteristics of a transformer core, the particular arrangement of which is illustrated schematically in Fig. 2.

On the other hand the exhibiting device of Fig. 3 is possessed of certain structural differences and operational advantages over the exhibiting device of Fig. 2. In the preferred embodiment the framework structure 36 of rectangular configuration, including the arms 37 and scale 14, is pivotally mounted by way of thrust-bearings 38 and 39 for rotation about a vertical axis. Accordingly, the entire weight of the framework structure 36 and the index device 15 is supported by the thrust-bearings and therefore the extent of force necessary to move the scale 14 and index device 15 in an X direction relative to the arcuate scale 13 and to the chart 16 is considerably reduced over the entire range of movement as compared with the force required for movement of these elements in the embodiment of Fig. 2. This arrangement improves the sensitivity of the measuring system by reducing the torque required to move the framework 36 and with it the scale 14 and index device 15 relative to the chart 16.

Material for the chart 16 may be supplied by individual sheets or alternatively by continuous strips fed from a supply roll 52. In the latter arrangement the marked sections of chart 16 may be stored on takeup roll 53. In either case the chart material is supported on a backing plate 16a of cylindrical configuration matching the path of the arcuate movement of the framework structure 36 and scale 14 in a horizontal direction. The backing plate or chart support 16a may be engraved or support calibrated strips along adjacent sides to provide fixed scales 13 and 14a. The chart 16 on its support 16a has a cylindrical surface whose axis of generation coincides with the vertical axis of rotation of the arms 37. As in Fig. 2 the chart should be made at least co-extensive with the length of the scales 13 and 14 to take advantage of the full-scale movement of the index device 15.

Instantaneous reading of magnitude of a measured variable along the scale 13 may be had by position of scale 14 relative thereto. Where the pen 19 is displaced, then such reading is provided by indicating element 20. The magnitude of the measured variable may be read with the aid of indicating element 21.

The framework structure 36 may be formed of aluminum stock in the interest of light weight construction and is of closed rectangular configuration. The scale 14 may be mounted to the forward leading surface of the framework 36 or it may be formed integral with the framework by engraving graduations on the framework surface. The former construction is preferred in that it makes possible a flexible arrangement permitting a ready variation of scales for recording and indicating many different conditions and characteristics.

The index 15, which moves along the scale 14 in a Y direction, driven by motor 33 in response to signals from voltage source $E_y$, is mounted on a carriage 54 having wheels 55 in rolling contact with the framework structure 36. At least one of the wheels 55 is disposed to roll on an edge or side of the scale portion of framework structure opposite the other two wheels 55 to provide for stability of movement of the index device 15 along the scale 14.

Figure 4:
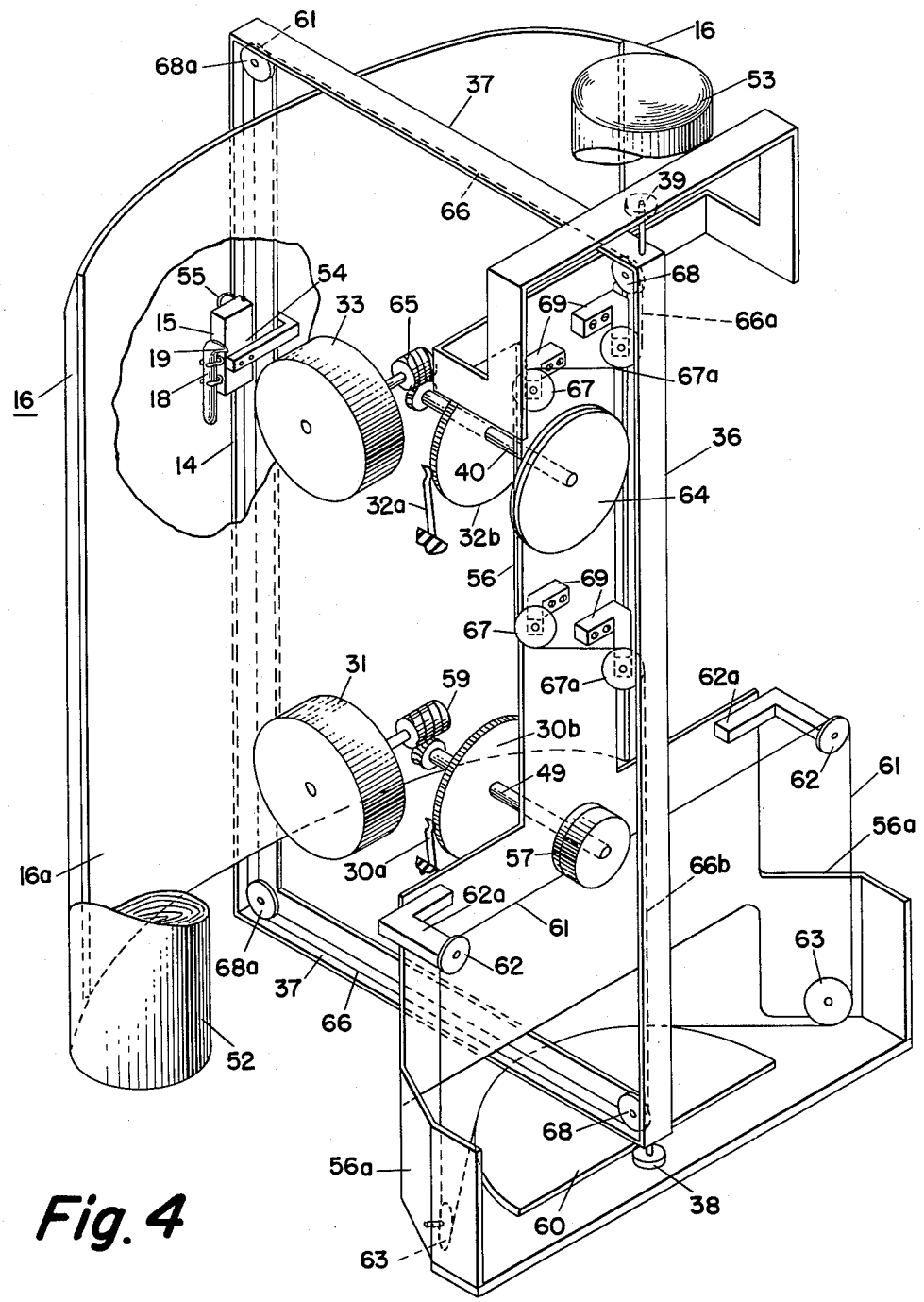
Fig. 4 illustrates in perspective another more detailed view of the embodiment of Fig. 3.

The movement of the index device in both X and Y, or horizontal and vertical directions, is effected through an arrangement of string-drives, best illustrated in Fig. 4. As will be remembered from the foregoing discussion, the index device 15 together with inking pen 19 is carried in a horizontal or X direction relative to the chart 16 and arcuate scale 13 by the rotation of the arms 37 about a vertical axis. The arms 37 are supported by the thrust-bearings 38, 39 mounted respectively at opposite ends of a structural frame 56.

The driving arrangement for the arms 37 includes the motor 31, here shown positioned in the space between the chart 16 and the axis of rotation of the arms. The motor 31 is mechanically connected to a string-drive pulley 57 by way of a stub shaft 49 and worm gearing 59. Rotation of the pulley 57, in response to the motor 31 drives a sector element 60, rigidly secured on one of the arms 37, by way of a cord or string 61 passing around the pulley 57 and having its ends connected at a common point on the periphery of the sector. The sector element 60 is positioned intermediate the arms 37 and has an arcuate periphery whose configuration is determined by striking an arc from the axis of rotation of the arms 37. In this manner the string 61 is maintained taut and slackening of the string, detrimental to accuracy of indication and recording, is avoided. The sector element 60 may be secured adjacent the axis of rotation or remote therefrom so long as its periphery is an arc of a circle whose center is the axis of rotation.

The cord or string 61 travels over a plurality of direction-changing pulleys 62, 63 rotatably mounted on fixed axes to the frame 56. The pulleys 62 are mounted by way of brackets 62a and are substantially coplanar with drive pulley 57. The pulleys 63 are mounted directly on sections 56a of the frame 56, which are obliquely disposed relative to the frame so that the pulleys, whose axes of rotation are respectively perpendicular to the surface of their associated section, are positioned along a tangent to the periphery of the sector element 60. In the driving arrangement above-described all axes of rotation are fixed while the arms 37 are driven over the entire range of travel.

In interest of accuracy of indication and recording the slidewire 30b may be mounted on the stub shaft 49 so that the position of the index device 15 is a true representation of the measured magnitude of the condition under observation.

The driving arrangement for the index device 15 in a vertical direction along the scale 14 includes the motor 33 which, like motor 31, is positioned in the space between the chart 16 and the vertical axis of rotation of the arms 37. The shaft of the motor 33 is connected to a string-drive pulley 64 by way of worm-gearing 65 and stub shaft 40. Rotation of the pulley 64 in response to movement of the motor 33 drives the index 15 by way of a cord 66 which passes over direction-changing pulleys 67, 67a, 68 and 68a and is connected by its ends to opposite ends of the index carriage 54. The pulleys 67, 67a, totaling four in number are coplanar and each of them is mounted to the stationary frame 56 by means of fixed brackets 69. The direction-changing pulleys 68 and 68a, four in number, are coplanar and are directly mounted to the movable framework 36. All the pulleys 64, 67, 67a, 68, 68a have fixed axes of rotation.

In order to prevent the movement of the index 15 along the scale 14 due solely to movement of the framework 36 and arms 37 about the vertical axis, the portions 66a and 66b of the cord or string 66 are located in the vertical axis of rotation of the framework. In carrying out this construction the pulleys 67a and 68 are located on their respective mounts such that the vertical axis of rotation of the framework 36 is tangential to the peripheries of the pulleys. By placing portions 66a and 66b of the string 66 in the vertical axis there is also prevented rotation of the framework 36 due solely to movement of the index device 15 along the scale 14.

In order to assure that the position of the index device 15 is a true representation of the measured magnitude of the condition under observation, the slidewire potentiometer 32b may be mounted directly on the stub shaft 40. In this manner there is avoided lost motion between the potentiometer and the string-drive pulley 64.

Now that several embodiments of the invention have been described, it is apparent that modifications may be made within the scope of the appended claims.

What is claimed is:

1. An exhibiting apparatus of the X—Y type for displaying the magnitude of an independent variable along one coordinate and for displaying the magnitude of a dependent variable along the other coordinate at right angles thereto comprising a pair of scales, supporting means for supporting one of said scales along one of said coordinates and for supporting the other of said scales along the other of said coordinates, index means for indicating by its position with respect to the position of one of said scales the magnitude of said independent variable and by its position with respect to the position of the other of said scales the magnitude of said dependent variable, a pair of supporting arms, pivotal means for said arms establishing a pivotal axis for their rotation relative to one of said scales, said arms being spaced one from the other a distance greater than the length of one of said scales, a member interconnecting the ends of said arms remote from said pivotal axis, means carried by said member for supporting said index thereon, a driving cord and associated pulleys respectively carried by said member and said arms, said cord being attached to said index and having portions respectively extending from said index in directions extending parallel to said member and thence in direction parallel to said arms and coinciding with said pivotal axis, a cord-driving member disposed adjacent said pivotal axis for moving said cord along said axis to move said index relative to said member, an arcuate driving member cooperatively disposed with at least one of said arms for rotating both of said arms and said member and said index about said axis, means for rotating said arcuate member in response to change in the magnitude of one of said variables, and means for rotating said cord-driving member in response to the magnitude of the other of said variables, whereby said index is moved to positions relative to said scales representative of the magnitudes of both of said variables.

2. The combination set forth in claim 1 in which said supporting means comprises a support for a chart calibrated along coordinates at right angles one to the other to form said pair of scales.

3. The combination set forth in claim 2 in which there is disposed in the region between said chart support and said pivotal axis a chart supply roll, the chart on said support normally being stationary, and means for removing from said chart supply roll a length of chart coextensive in length with said chart support.

4. The combination set forth in claim 2 in which said arms are interconnected by a second member adjacent said pivotal axis to form therewith a rigid rectangular frame carrying said index and said driving pulleys and said driving cord, said cord-driving means, said arcuate driving member and said means for rotating said arcuate member being disposed intermediate said members forming said rectangular frame.

5. Electrical exhibiting apparatus comprising two scales, the first of which is arcuate in shape and the second of which extends at right angles to said first scale, arms carrying said second scale, means pivoting said arms for rotation about an axis for movement of said second scale along the arcuately disposed first scale, means driving said arms in response to variation in the magnitude of a first variable for indication on said first scale of the instantaneous value of said variable by the position of said second scale with respect to said first scale, means including an index carried by said arms and bodily movable relative to said first scale upon rotation of said arms and also movable longitudinally of said second scale, and driving means responsive to a second variable for moving said index along said second scale for indicating instantaneous values of said second variable on said second scale, said driving means having driving structure coinciding with the axis of rotation of said arms, rotation of said arms about said axis being ineffective to move said driving structure to change the position of said index relative to said second scale, said driving structure at said axis of said arms being operatively connected to said index for movement thereof along said second scale by said driving means without applying torque to said arms in a direction tending to change their position about said axis.

6. An exhibiting apparatus of the X—Y type for displaying the magnitude of an independent variable along one coordinate and for displaying the magnitude of a dependent variable along the other coordinate at right angles thereto comprising a pair of scales, supporting means for supporting one of said scales along one of said coordinates and for supporting the other of said scales along the other of said coordinates, index means for indicating by its position with respect to the position of one of said scales the magnitude of said independent variable and by its position with respect to the position of the other of said scales the magnitude of said dependent variable, a pair of supporting arms, pivotal means for said arms establishing a pivotal axis for their rotation relative to one of said scales, said arms being spaced one from the other a distance greater than the length of one of said scales, a member interconnecting the ends of said arms remote from said pivotal axis, means carried by said member for supporting said index thereon, a driving cord and associated pulleys respectively carried by said member and said arms, said cord being attached to said index and having portions respectively extending from said index in directions parallel to said member and thence in direction parallel to said arms and coinciding with said pivotal axis, a cord-driving member disposed adjacent said pivotal axis for moving said cord along said axis to move said index relative to said member, a sector element mounted on one of said arms for rotating both of said arms, said member and said index about said axis, means for rotating said sector element in response to change in the magnitude of one of said variables, and means for rotating said cord-driving member in response to the magnitude of the other of said variables, whereby said index is moved to positions relative to said scales representative of the magnitudes of both of said variables.

7. An exhibiting apparatus of the X—Y type for displaying the magnitude of an independent variable along one coordinate and for displaying the magnitude of a dependent variable along the other coordinate at right angles thereto comprising a pair of scales, supporting means for supporting one of said scales along one of said coordinates and for supporting the other of said scales along the other of said coordinates, index means for indicating by its position with respect to the position of one of said scales the magnitude of said independent variable and by its position with respect to the position of the other of said scales the magnitude of said dependent variable, a pair of supporting arms, pivotal means for said arms establishing a pivotal axis for their rotation relative to one of said scales, said arms being spaced one from the other a distance greater than the length of one of said scales, a member interconnecting the ends of said arms remote from said pivotal axis, means carried by said member for supporting said index thereon, a driving cord and associated pulleys respectively carried by said member and said arms, said cord being attached to said index and having portions respectively extending from said index in directions parallel to said member and thence in direction parallel to said arms and coinciding with said pivotal axis, a cord-driving member disposed adjacent said pivotal axis for moving said cord along said axis to move said index relative to said member, a cam-follower rotatably mounted on each of said arms, a pair of cams each of which is respectively in contact with a cam-follower for rotating both of said arms, said member and said index about said axis, means for rotating said cams in response to change in the magnitude of one of said variables, and means for rotating said cord-driving member in response to the magnitude of the other of said variables, whereby said index is moved to positions relative to said scales representative of the magnitudes of both of said variables.

8. An exhibiting apparatus of the X—Y type for displaying the magnitude of one of two variables along one coordinate and for displaying the magnitude of the other variable along the other coordinate at right angles thereto comprising a pair of scales, one of said scales forming a section of a cylindrical surface, index means for indicating by its position with respect to the position of one of said scales the magnitude of said one variable and by its position with respect to the position of the other of said scales the magnitude of said other variable, a frame rotatable about said axis, said index means mounted for movement along said frame and relative to one of said scales and with said frame movable relative to the other of said scales, a first cord linkage in driving connection with said index means and having a portion thereof coinciding with said axis, drive means for said cord linkage responsive to changes in magnitude of one of said variables, a second cord linkage in driving connection with said frame, and driving means for said second cord linkage responsive to changes in magnitude of said other variable, said driving means including an arcuate driving member cooperatively disposed within said frame for rotating said frame and said index about said axis.

9. An exhibiting apparatus of the X—Y type for displaying the magnitude of one of two variables along one coordinate and for displaying the magnitude of the other variable along the other coordinate at right angles thereto comprising a pair of scales, one of said scales forming a section of a cylindrical surface having a vertical axis, index means for indicating by its position with respect to the position of one of said scales the magnitude of said one variable and by its position with respect to the position of the other of said scales the magnitude of said other variable, a frame rotatable about said vertical axis, said index means mounted for movement along said frame and relative to one of said scales and with said frame movable relative to the other of said scales, a first cord linkage in driving connection with said index means and having a portion thereof coinciding with said vertical axis, drive means for said cord linkage responsive to changes in magnitude of one of said variables, a second cord linkage in driving connection with said frame, and driving means for said second cord linkage responsive to changes in magnitude of said other variable, said driving means including a sector element mounted on said frame for rotating said frame and said index about said vertical axis.

10. An exhibiting apparatus for displaying the magnitudes of two related variables in a two dimensional rectangular coordinate system comprising an index, a frame mounting said index for translation along a straight line portion of said frame relative to one of the coordinates of said system, said frame being pivotally mounted for rotation about an axis parallel to and spaced from said straight line portion of said frame for movement of said index along the other coordinate of said system, a first cord drive for rotating said frame about its axis in response to changes in the magnitude of one of said variables, and a second cord drive for positioning said index along said straight line portion of said frame in response to changes in the magnitude of the other of said variables, at least a portion of said second cord drive being disposed in said axis of rotation of said frame in order that the rotation of said frame will not affect the position of said index along said straight line portion of said frame.

No references cited.